United States Patent [19]
Greve

[11] Patent Number: 5,820,801
[45] Date of Patent: Oct. 13, 1998

[54] REINFORCED THERMOPLASTIC MOLDING TECHNIQUE METHOD

[75] Inventor: Bruce Norman Greve, Clarkston, Mich.

[73] Assignee: The Budd Company, Troy, Mich.

[21] Appl. No.: 874,087

[22] Filed: Jun. 12, 1997

Related U.S. Application Data

[63] Continuation of Ser. No. 443,419, May 18, 1995, abandoned, which is a continuation-in-part of Ser. No. 162,455, Dec. 3, 1993, Pat. No. 5,685,956, which is a continuation-in-part of Ser. No. 881,851, May 12, 1992, Pat. No. 5,286,326.

[51] Int. Cl.$^6$ .............................. B28B 1/26; B29C 43/02
[52] U.S. Cl. .......................... 264/86; 264/122; 264/124; 264/301; 264/325; 425/84
[58] Field of Search ................................ 264/86, 87, 122, 264/124, 301, 325; 425/84, 85

[56] References Cited

U.S. PATENT DOCUMENTS

| | | |
|---|---|---|
| 1,342,184 | 6/1920 | Rauer . |
| 1,549,903 | 8/1925 | Buel . |
| 1,676,798 | 7/1928 | O'Brien . |
| 1,725,465 | 8/1929 | Manson . |
| 1,880,458 | 10/1932 | Morris . |
| 1,955,249 | 4/1934 | Morris . |
| 2,393,541 | 1/1946 | Kohler . |
| 2,407,833 | 9/1946 | Jablonsky . |
| 2,471,932 | 5/1949 | Chaplin . |
| 2,476,282 | 7/1949 | Castellan . |
| 2,526,125 | 10/1950 | Francis, Jr. . |
| 2,780,147 | 2/1957 | Richter et al. . |
| 2,962,762 | 12/1960 | Hartmann et al. . |
| 2,975,470 | 3/1961 | Snelson et al. ................ 425/85 X |
| 3,014,835 | 12/1961 | Feigley, Jr. et al. . |
| 3,261,740 | 7/1966 | Wells . |
| 3,325,349 | 6/1967 | Reifers . |
| 3,373,079 | 3/1968 | Eastman et al. . |
| 3,442,757 | 5/1969 | Williams . |
| 3,449,207 | 6/1969 | Modersohn . |
| 3,612,803 | 10/1971 | Klaas . |

(List continued on next page.)

FOREIGN PATENT DOCUMENTS

| | | |
|---|---|---|
| 587989 | 12/1959 | Canada . |
| A-0 062 142 | 10/1982 | European Pat. Off. . |
| 0341977 | 11/1989 | European Pat. Off. ................. 264/87 |
| A-36 14 533 | 11/1987 | Germany . |
| 47-7726 | 3/1972 | Japan . |
| 1511185 | 5/1978 | United Kingdom . |

OTHER PUBLICATIONS

Jack K. Rogers, "Structural Composites: Moving the Dream Closer to Reality", Plastics Technology, Sep. 1989, pp. 108–117.

J.A. Keown and R.W. Curtis, "Wet Slurry Process Brings Precision To Reinforced Plastics".

"Man–Made Fibers, Manufacture", Encyclopedia of Polymer Science and Technology, vol. 8, John Wiley and Sons, 1968, pp. 374–404.

"Manufactured Fiber", McGraw Hill Encyclopedia of Science and Technology, vol. 10, 6th Edition, 1987, pp. 375–380.

*Primary Examiner*—Karen Aftergut
*Attorney, Agent, or Firm*—Harness, Dickey & Pierce, P.L.C.

[57] ABSTRACT

A method and apparatus for binding the fibers of, and forming a fiber reinforced plastic structure. A fiber reinforced plastic preform is created by depositing a mixture of reinforcing fibers, binding fibers and resin matrix fibers on a screen having a preselected geometry. The fiber reinforced plastic preform is exposed to high temperature fluid causing the binding fibers to melt and, thereafter, to cool air to temporarily bind the preform in a tackified state. The tackified preform is exposed to a higher temperature fluid causing the resin matrix fibers to melt and, thereafter, to cool air to solidify and thus bind and lock the reinforcing fibers of the tackified preform in place to create a homogeneous fiber reinforced plastic structure.

11 Claims, 6 Drawing Sheets

U.S. PATENT DOCUMENTS

| | | |
|---|---|---|
| 3,954,555 | 5/1976 | Kole et al. . |
| 4,162,877 | 7/1979 | Nyberg ........................................ 425/84 |
| 4,162,935 | 7/1979 | Kollmann et al. . |
| 4,204,907 | 5/1980 | Korklan et al. . |
| 4,238,176 | 12/1980 | Cottrell, Jr. et al. ................. 264/82 X |
| 4,439,122 | 3/1984 | Besse et al. ........................... 264/87 X |
| 4,444,806 | 4/1984 | Morgan et al. . |
| 4,647,415 | 3/1987 | Schafft . |
| 4,663,225 | 5/1987 | Farley et al. ........................ 264/257 X |
| 4,683,028 | 7/1987 | Waller et al. ......................... 425/85 X |
| 4,740,346 | 4/1988 | Freeman . |
| 4,769,274 | 9/1988 | Tellvik et al. . |
| 4,775,705 | 10/1988 | Parker et al. . |
| 4,812,283 | 3/1989 | Farley et al. . |
| 4,818,448 | 4/1989 | Wrenn, Jr. et al. . |
| 4,849,147 | 7/1989 | Freeman . |
| 4,863,771 | 9/1989 | Freeman . |
| 4,869,855 | 9/1989 | Twilley et al. . |
| 4,882,114 | 11/1989 | Raduan et al. ........................ 264/86 X |
| 5,039,465 | 8/1991 | Freeman et al. .................... 264/257 X |
| 5,217,654 | 6/1993 | Buckley .............................. 264/325 X |
| 5,217,656 | 6/1993 | Buckley et al. .................... 264/258 X |
| 5,286,326 | 2/1994 | Greve ................................. 264/257 X |
| 5,296,065 | 3/1994 | Greatorex ........................... 156/221 X |

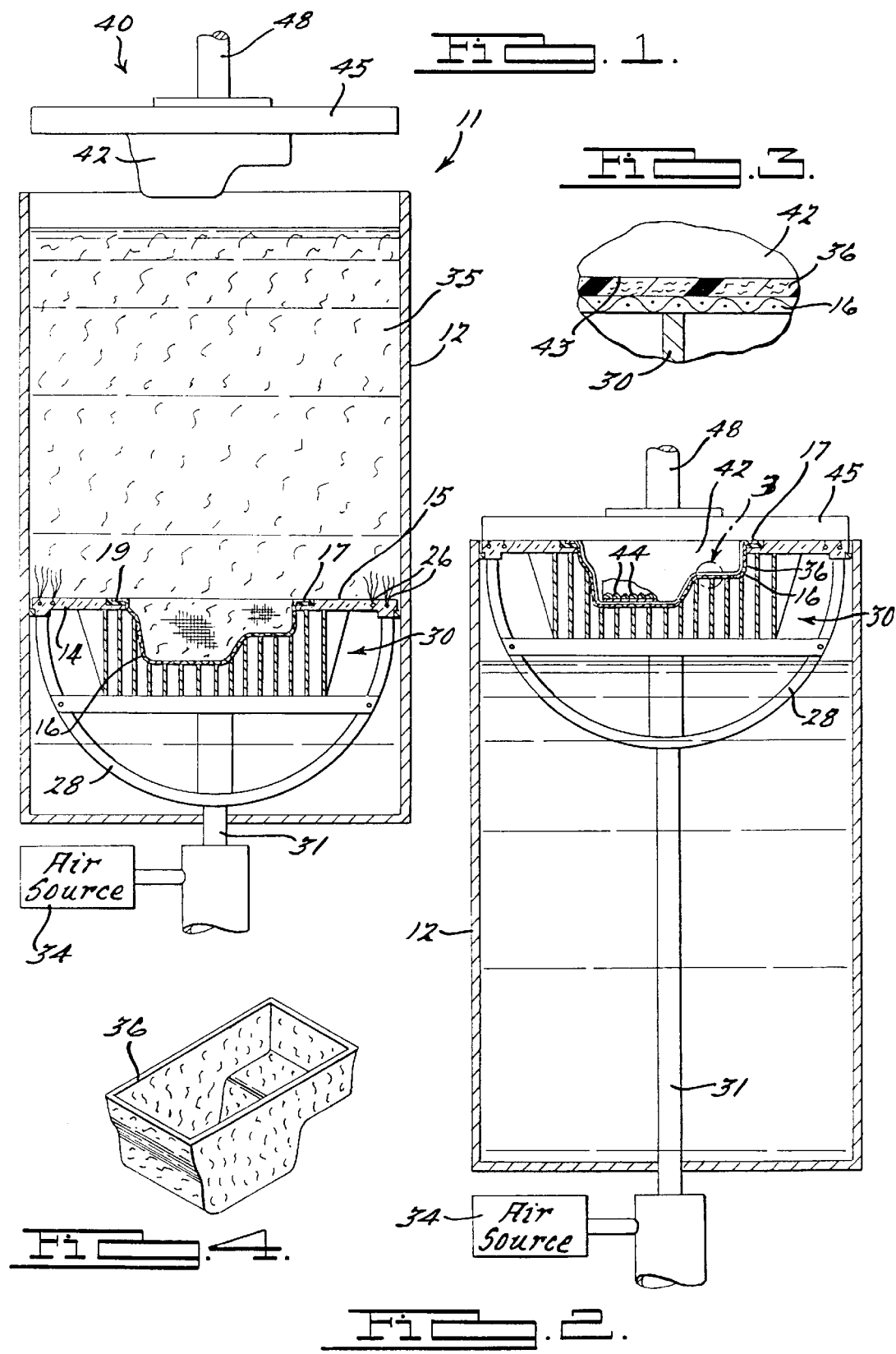

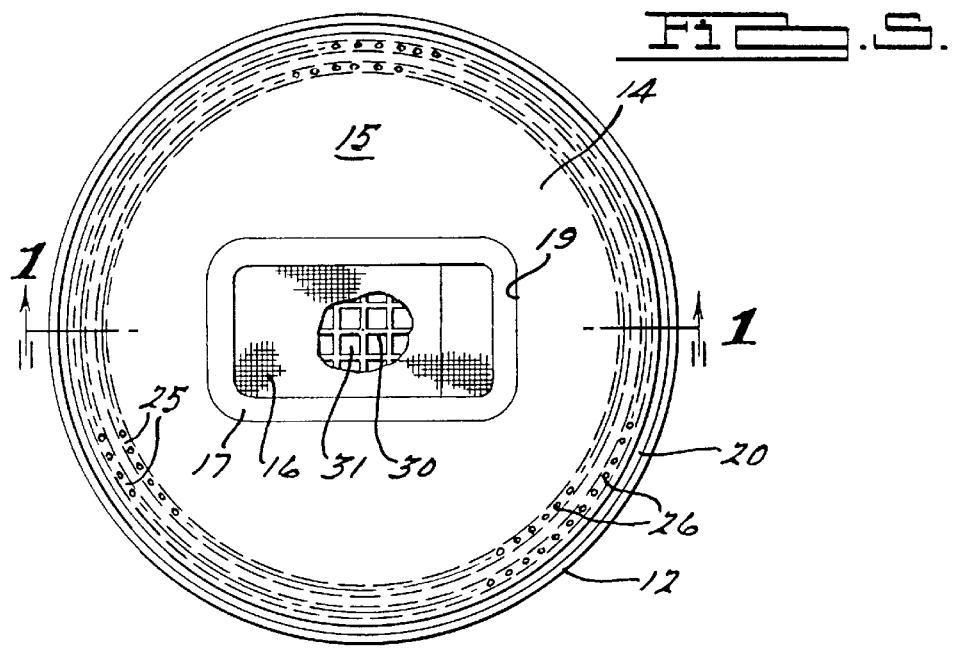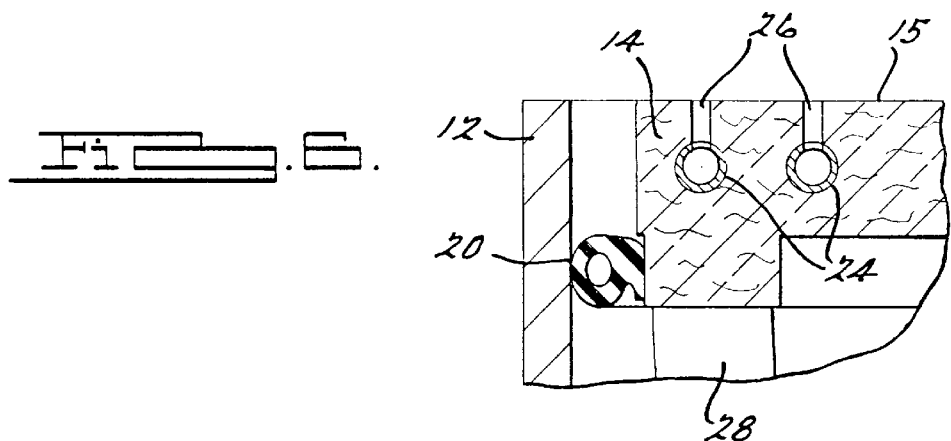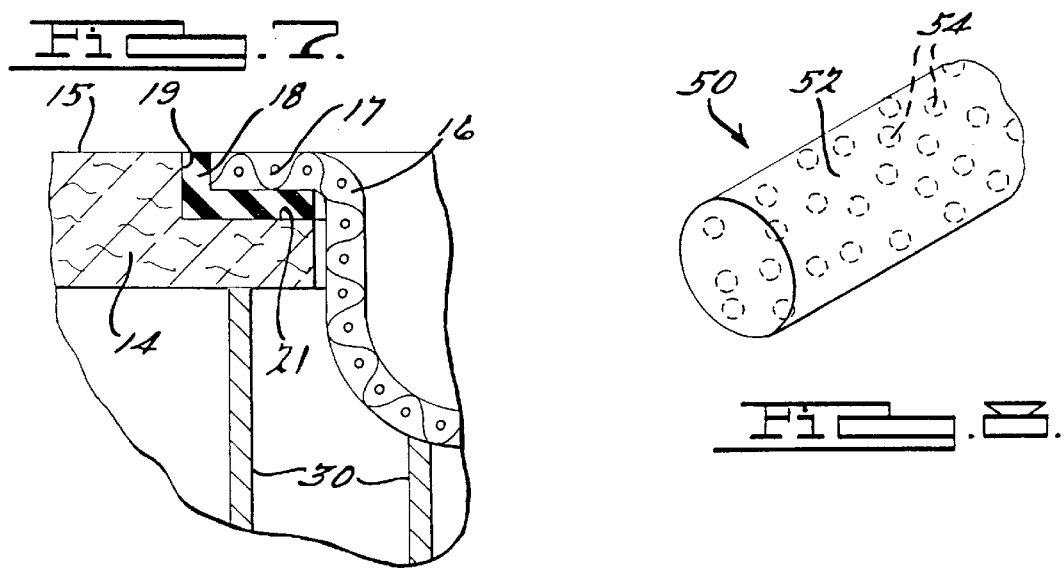

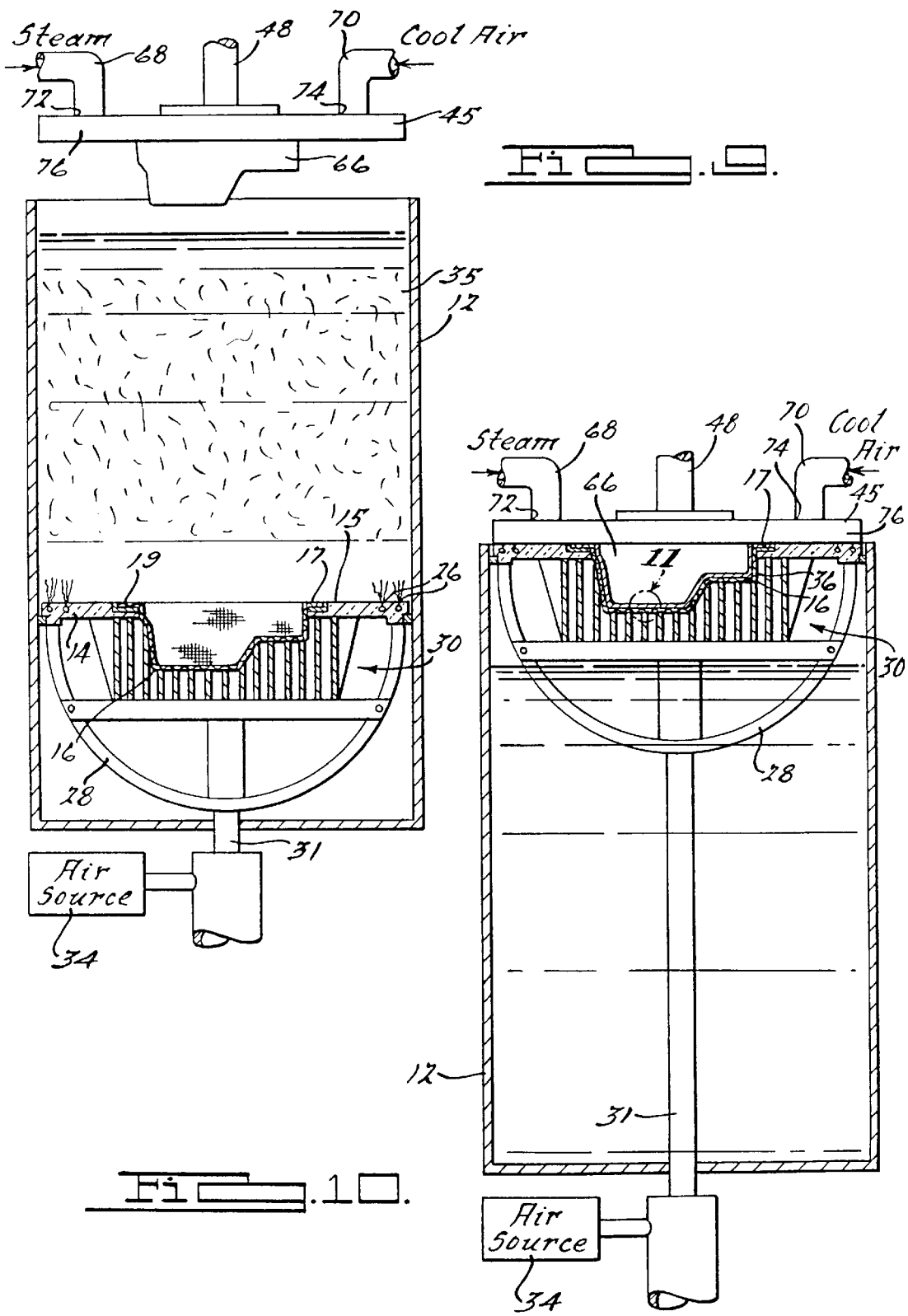

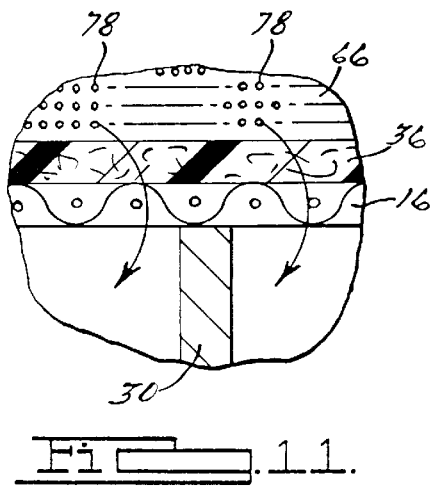
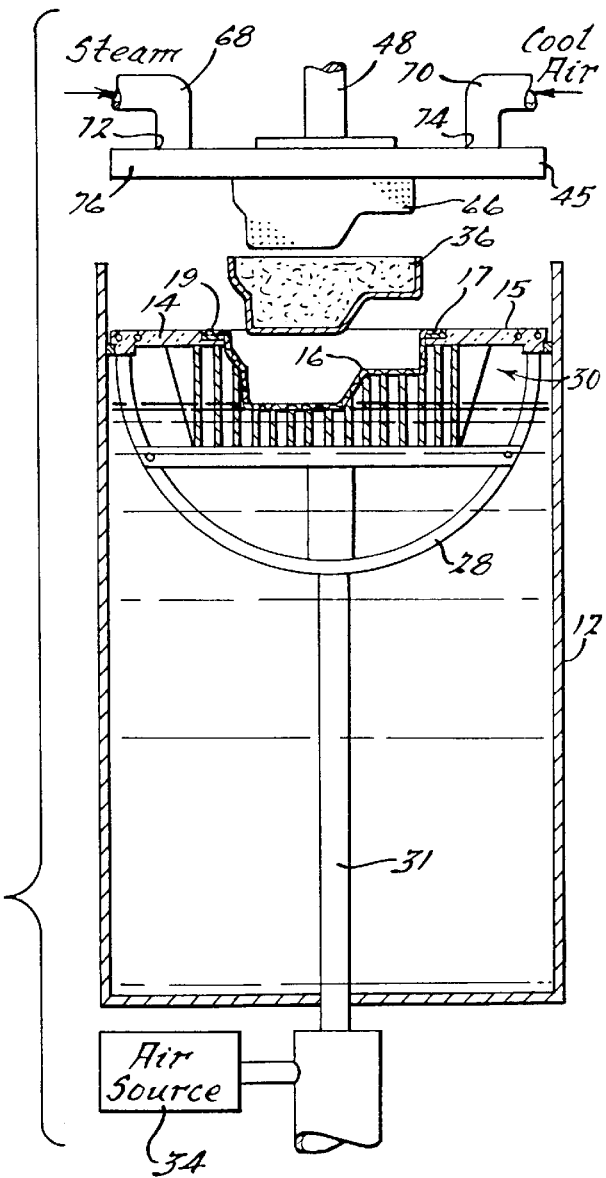

FIG. 13.
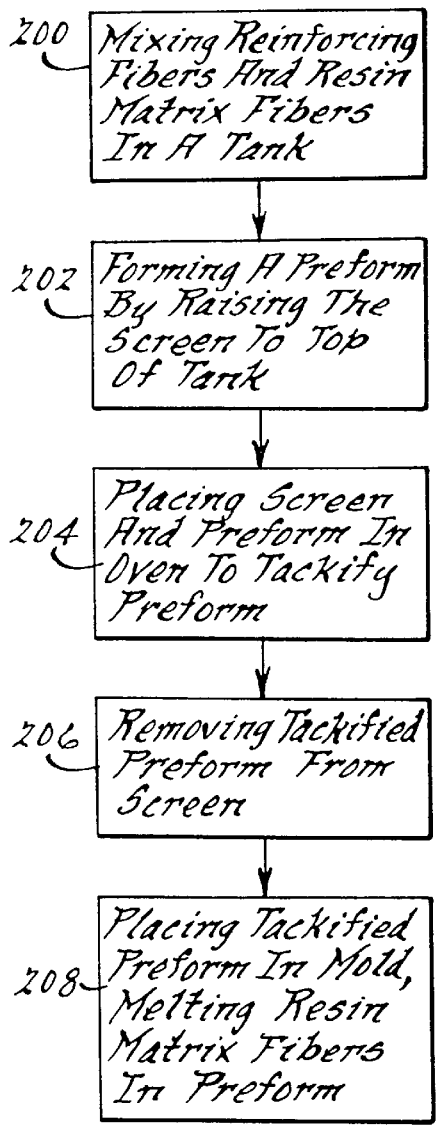
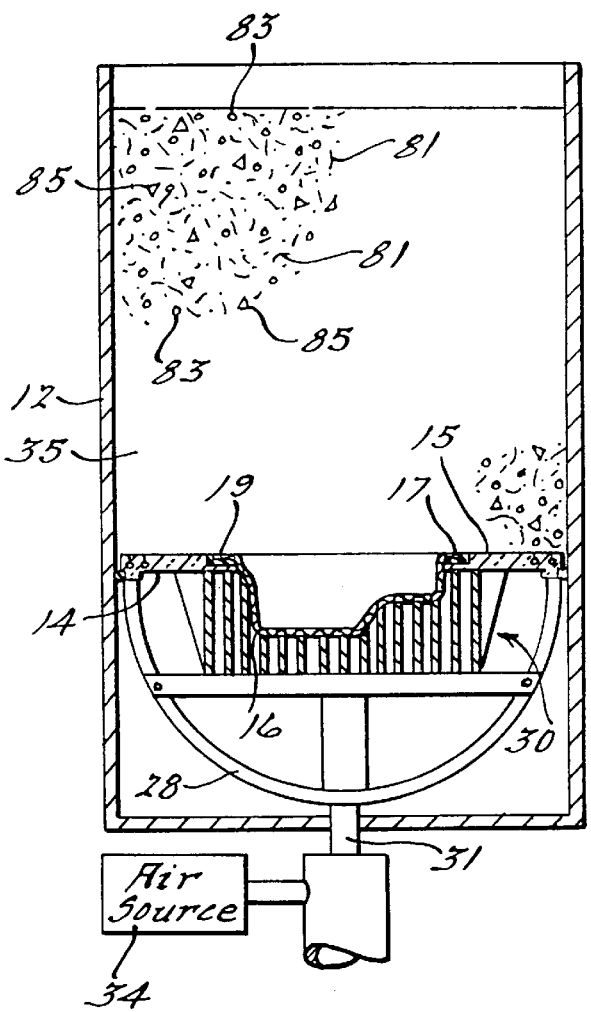
FIG. 14.

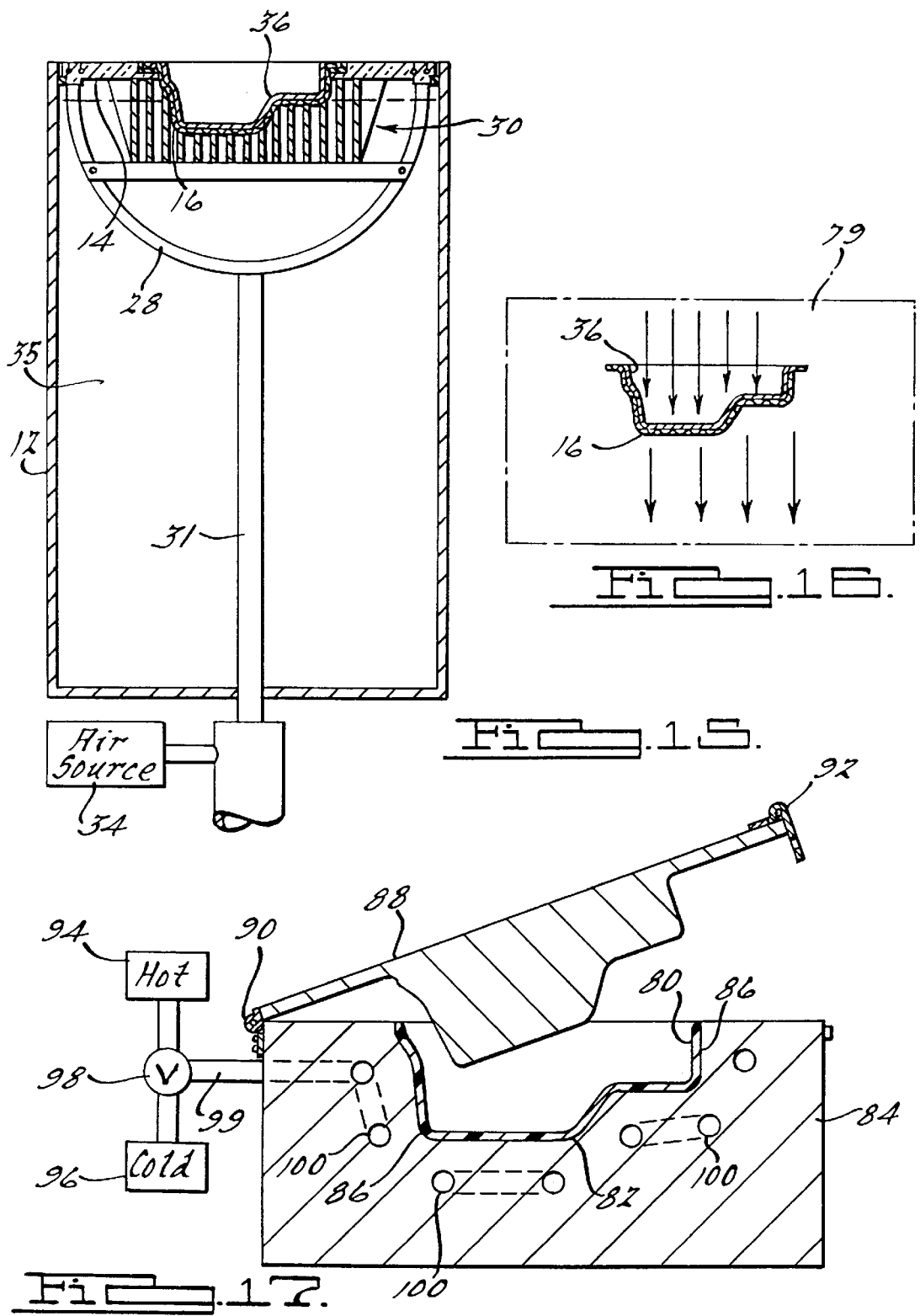

REINFORCED THERMOPLASTIC MOLDING TECHNIQUE METHOD

This is a continuation of U.S. patent application Ser. No. 08/443,419, filed May 18, 1995, now abandoned, which is a continuation-in-part of application Ser. No. 08/162,455 filed Dec. 3,1993, now U.S. Pat. No. 5,685,956, which is a continuation-in-part of application Ser. No. 07/881,851 filed May 12, 1992, now U.S. Pat. No. 5,286,326.

BACKGROUND OF THE INVENTION

The present invention relates generally to forming fiber reinforced plastic structures and, more particularly, to a method and apparatus for binding the fibers of a fiber reinforced plastic structure.

Fiber reinforced plastic (FRP) parts or composite parts are well known and used in a wide variety of applications. An FRP part generally consists of a plastic shape in which carbon, fiberglass, or other reinforcing fibers are dispersed in order to provide strength to the plastic. One method of making an FRP part is known as resin transfer molding (RTM). In RTM, fibrous material in a mold is injected with resin which cures to form the part. Examples of these techniques are disclosed in commonly assigned U.S. Pat. Nos. 4,740,346; 4,849,147; 4,863,771; and 5,286,326 which are hereby incorporated by reference. In RTM, fibrous material is often formed into a preliminary shape before being placed into the mold. The shaped sections generally conform to the shape of adjacent mold die surfaces and are known as preforms. Preforms have been made in several different manners. One approach is to direct chopped fibers by means of a flow of air onto a screen. One problem with this technique is that it is difficult to obtain desired fiber orientation. Another method is to make the preforms from mats of fibrous material. This method however results in undesirable amounts of scrap and is labor intensive thus resulting in production cost inefficiencies. Still another technique known as a wet slurry process is disclosed, for example, in Keown et al., "Wet Slurry Process Brings Precision To Reinforced Plastics". As discussed therein, a slurry containing chopped glass strands or fibers is drawn by vacuum into a chamber covered by a screen. As a result the fibers are deposited on the screen. This approach, however, also has some drawbacks. For example, it is somewhat difficult to consistently obtain the desired fiber orientation and compactness or density of the fibers using this equipment. In addition, the pumps and other equipment required to create the vacuum and draw the slurry through the screen may be unduly complex and difficult to maintain. Furthermore, the process is relatively slow. An improved wet slurry process is disclosed in commonly assigned U.S. Pat. No. 5,039,465, which is also hereby incorporated by reference. The process disclosed therein teaches drawing the slurry through the screen by raising the screen through a tank containing a slurry of fibers resulting in the fibers being deposited on the screen. Further disclosed are unique configurations for the holes in the screen to direct the fibers into desired orientations.

Of concern in any preform forming process is handling the fiber preform without disturbing the shape of the preform or the orientation of the fibers. To this end, commonly assigned U.S. Pat. No. 5,286,326 discloses that a binding material may be deposited along with the fibers when forming the preform. The binding material gives the preform sufficient strength to allow for handling without disturbing its shape or the orientation of the fibers. In typical applications, the binding material is a thermoplastic fiber mixed into the slurry with the reinforcing fibers in a wet slurry process or blown onto the screen along with the reinforcing fibers if an air blown process is used.

After the preform is shaped, the preform, still on the screen, is introduced to a high frequency electromagnetic field for several seconds, thus melting the binding fibers and binding the reinforcing fibers of the preform. The preform then can be readily removed from the screen and handled without damaging it. The preform is then placed into a mold. Resin is then injected into the mold to impregnate the fibers in the preform and form the desired structure. While these methods and apparatuses are satisfactory, the present invention is believed to even further improve the art.

SUMMARY OF THE INVENTION

In accordance with the teachings of the present invention, a preform is created that has a mixture of reinforcing fibers and meltable resin matrix fibers. The preform is heated to a temperature sufficient to melt the resin matrix fibers such that the resin matrix fibers flow to surround the reinforcing fibers to yield, after cooling, a substantially homogeneous fiber reinforced plastic structure. Preferably, the preform is created by a slurry process in which two different types of thermoplastic fibers are introduced into the slurry along with the reinforcing fibers. The first type of thermoplastic fibers, binder thermoplastic fibers, have a lower melting point than the second type of thermoplastic fibers and serve to temporarily bind or tackify the preform together. The second thermoplastic fibers have a higher concentration and a higher melting point than the binder thermoplastic fibers. The second type of thermoplastic fibers serve as the resin matrix fibers which, after heating, provide the matrix for holding the reinforcing fibers together to form a structural part.

BRIEF DESCRIPTION OF THE DRAWINGS

The various advantages of the present invention will become apparent to one skilled in the art after reading the following specification and by reference to the drawings in which:

FIG. 1 is a front cross-sectional view taken along the lines 1—1 of FIG. 5 of a fiber reinforced plastic preform forming apparatus of the present invention with the screen positioned at the bottom of the tank;

FIG. 2 is a view of a fiber reinforced plastic preform forming apparatus of the present invention after the screen has been raised to the top of the tank and an electromagnetic field generator is moved into close proximity to the fiber reinforced plastic preform;

FIG. 3 is an enlarged partial cross-sectional view of the apparatus showing the electromagnetic field generator in contact with and compressing the fibers of the fiber reinforced plastic preform as deposited on the contoured screen;

FIG. 4 is a perspective view of a fiber reinforced plastic preform of the present invention;

FIG. 5 is a top view of the apparatus partially broken away to further illustrate the matrix subframe structure;

FIG. 6 is an enlarged partial cross-sectional view of the apparatus showing the seal and bubbler apparatus in particular detail;

FIG. 7 is an enlarged partial cross-sectional view of the apparatus showing the screen mounting into a mask and matrix subframe;

FIG. 8 is a perspective view of a binder fiber made in accordance with the teachings of the present invention showing a matrix material with a dispersion of ferromagnetic particles;

FIG. 9 is a front cross-sectional view similar to FIG. 1 of a fiber reinforced plastic preform forming apparatus according to a second embodiment of the present invention with the removable contoured first screen positioned at the bottom of the tank;

FIG. 10 is a view of a fiber reinforced plastic preform forming apparatus of the second embodiment of the present invention after the first screen has been raised to the top of the tank and a second screen is moved into close proximity to the fiber reinforced plastic preform;

FIG. 11 is an enlarged partial cross-sectional view of the apparatus showing the second screen in contact with and compressing the reinforcing fibers and the binding material of the fiber reinforced plastic preform on the first screen;

FIG. 12 is a view similar to FIG. 10 with the second screen retracted from the fiber reinforced plastic preform, and the fiber reinforced plastic preform removed from the first screen according to a second preferred embodiment of the present invention;

FIG. 13 is a schematic representation of the method for forming a fiber reinforced plastic structure according to the third embodiment of the present invention;

FIG. 14 is a front cross-sectional view similar to FIGS. 1 and 9 of a tank portion of a fiber reinforced plastic structure forming apparatus according to a third embodiment of the present invention with the removable contoured screen positioned at the bottom of the tank;

FIG. 15 is a view of a fiber reinforced plastic structure forming apparatus of the third embodiment of the present invention after the screen has been raised to the top of the tank;

FIG. 16 is a view of a fiber reinforced plastic preform and screen of the third embodiment of the present invention in an oven wherein high temperature steam or fluid is drawn through the preform and screen to create a tackified preform; and FIG. 17 is a view of a tackified preform of the third embodiment of the present invention in a complementary cavity of a mold.

DESCRIPTION OF THE PREFERRED EMBODIMENTS

It should be understood from the outset that the scope of the present invention need not be limited to the particular examples used in connection with this invention since those skilled in the art will appreciate that its teachings can be used in a wide variety of applications. With this caveat in mind, the present invention will be described for exemplary purposes embodied in a wet slurry process an example of which is disclosed in the aforementioned commonly assigned U.S. Pat. No. 5,039,465. With reference then to FIGS. 1 and 7, a contoured screen 16 having a defined geometry and containing openings of a preselected pattern has been placed in an aperture 19 formed in the surface of mask 14. The inner portion of mask 14 defining aperture 19 is provided with an offset or rabbetted surface 21 allowing seal 18 and a radially extending lip 17 of screen 16 to fit flush to planar surface 15 of mask 14. Mask 14 and screen 16 are shown supported by frame member 28 and matrix subframe 30. The subframe 30 is a grid of vertically extending metal bars and horizontally extending cross members. The top portion of matrix subframe 30 is suitably contoured to substantially match the contoured shape of screen 16 and thereby provide support over the entire surface area of screen 16. The bottom portion of subframe 30 is in contact with and suitably connected to frame member 28 thereby receiving support. As can best be seen in FIG. 5, matrix subframe 30 defines a plurality of openings 31 for allowing liquid passing through contoured screen 16 to further pass substantially unobstructed through matrix subframe 30.

As shown in FIG. 1, contoured screen 16 is initially positioned at the bottom of tank 12. Tank 12 is then filled with water and chopped reinforcing fibers such as glass, graphite, polyester or other suitable reinforcing fibers to create a slurry 35. Typically, the reinforcing fibers will be in bundles having approximately 500 filaments and a diameter of 2.5 to 25 microns with the bundles cut into one half to six inch lengths. Further added to slurry 35 are binding fibers 50. Preferably, the binding fibers comprise approximately about 3–10 and, preferably, 6 percent by weight of the total weight of the fibers added to create slurry 35.

The binding fiber 50 of the present invention is shown in FIG. 8 as a combination 52 of thermoplastic material having therein dispersed a quantity of filler material 54 having ferromagnetic properties. The combination material 52 may be any of the thermoplastic materials, such as thermoplastic polyester, polypropylene, polyethylene, or nylon, suitable for forming into fibers. The filler material may be any ferromagnetic material which may be made into small particles to be dispersed into the thermoplastic matrix. Several types of suitable ferromagnetic materials are discussed in U.S. Pat. No. 2,393,541 (hereby incorporated by reference) and include iron, nickel, cobalt and their respective ferromagnetic alloys and oxides. The fiber 50 could consist of a thermoplastic polyester material with a 5–20 percent by weight dispersion of iron oxide particles having an irregular spherical shape approximately about 0.5–5 microns in diameter. When exposed to a high frequency electromagnetic field, the filler material 54 produces heat which then melts the thermoplastic material 52 binding the reinforcing fibers of the fiber preform in place. The fibers 50 can be made by melting a mass of thermoplastic material, adding thereto a mass of ferromagnetic material, mixing them to create a homogeneous mixture, extruding the mixture through a spinnerette or other suitable device and spinning or drawing it to a predetermined diameter. The fiber may then be cut to length. In the present invention, the fiber 50 is preferably 25–50 microns in diameter and cut approximately about 0.25–1.25 inches in length.

With reference once again to FIGS. 1 and 2, contoured screen 16, mask 14 and frame 28 are raised to the top of tank 12 by activating a piston 31 attached to frame 28. In raising screen 16 to the top of tank 12 it is desirable to raise screen 16 quickly enough to create a partial vacuum on the underside of screen 16. This partial vacuum accompanied with the atmospheric pressure bearing down on the portion of slurry 35 above screen 16 cause the flow of slurry 35 through contoured screen 16 and the dispersion of fibers onto the screen. The slurry is prevented from passing between mask 14 and walls of tank 12 by seal 20. This pressure differential, however, is equalized when any portion of mask 14 or screen 16 breaks the surface of slurry 35 thereby stopping the flow of slurry 35 through screen 16. It is therefore advantageous to maintain screen 16 below the surface of slurry 35 as long as possible. As can be seen in FIGS. 2 and 5, planar surface 15 of mask 14 is shown extending from the outer walls of tank 12 inwardly to aperture 19. Thus planar surface 15 of mask 14 allows for the pressure differential to be maintained for the maximum period of time by substantially maintaining all portions of screen 16 and mask 14 below the surface of slurry 35 until screen 16 reaches the top of tank 12. In raising screen 16 to the top of the tank, planar surface 15 further advantageously provides a smooth, unobstructed surface over which substantially all of the fibers of slurry 35 may be swept into contoured screen 16. Another advantage of mask 14 and planar surface 15 is demonstrated by the provision for mixing the reinforcing fibers.

As can be seen in FIGS. 5 and 6, embedded in mask 14 below planar surface 15 is a plurality of dispersion tubes 24 connected to the surface of mask 14 by a plurality of apertures 26 formed in mask 14. Air or water or other fluid is advantageously conducted to dispersion tubes 24 from a source 34 through hollow piston rod 31 and suitable connections to conduct fluid from hollow piston rod 31 to dispersion tubes 24. Air provided to tubes 24 is then conducted into tank 12 via apertures 26. In this manner slurry 35 is agitated directly above planar surface 15 thus assuring an even distribution of the reinforcing and binding fibers in slurry 35 and further improving the flow of slurry 35 over planar surface 15 to contoured screen 16.

FIGS. 2 and 3 show the first embodiment of the present apparatus in its finished position. Once raised to the top of tank 12 the reinforcing fibers and binding fibers of slurry 35 are deposited on contoured screen 16 in the desired preformed shape 36. High frequency electromagnetic field generator 40 is then lowered into close proximity with fiber preform 36. In this embodiment, high frequency electromagnetic field generator 40 has a contoured plug 42 of substantially the same shape as preform 36 mounted to a base 45. Embedded near the surface 43 of plug 42 are a plurality of electromagnetic induction coils 44. Thus, when lowered under the action of piston 48, plug 42 slightly compacts the fibers of preform 36 as a high frequency electromagnetic field is generated thereby melting the thermoplastic binding fibers and temporarily binding the reinforcing fibers of preform 36. In the present invention, the high frequency electromagnetic field is generated by a suitable control source (not shown) in the range of 2 KHz to 2 MHz with a typical application consisting of 1 MHz field active for approximately about 2–15, and preferably about 5 seconds.

While all of the theoretical technical details of the binding action of the present invention are not completely understood, it is believed that the heating of the binding fibers 50 by the electromagnetic field raises the temperature in the immediate area to cause localized vaporization of any water droplets adjacent to the binding fibers. In addition, the heat of the binding fibers, during application of the electromagnetic field, may cause water droplets to be driven away from the hot binding fibers thereby allowing the binding fibers to melt and act as an adhesive to bind together adjacent reinforcing fibers. When the electromagnetic field is removed, the water droplets in the vicinity tend to return to their original location due to capillary action thereby quenching the hot binding fibers to cool and solidify them. Accordingly, the electromagnetic field need be applied only for a limited period of time in order to transform the wet, unmanageable raw preform into an easily handled unit.

Once the reinforcing fibers of preform 36 have been temporarily bound together, preform 36 may be removed from contoured screen 16 by any suitable method. An exemplary preform made in accordance with the teachings of this embodiment of the present invention is illustrated in FIG. 4. In practice of the invention, contoured screen 16 would be suitably coated with Teflon® or other anti-sticking compound so as to prevent sticking of preform 36 to contoured screen 16 thereby improving the removal process. The removed preform then can be subjected to a drying process to remove residual water from the preform. This can be accomplished in a variety of manners such as forced air convection drying and other suitable methods which would be compatible with the teachings of the present invention. Once preform 36 is dried, a fiber reinforced part is created by placing the preform in a mold and injecting resin into the mold. The resin impregnates the fibers of the preform thereby forming the desired structure.

FIGS. 9–12 show a second embodiment of the present invention. Like reference numerals are used to identify like elements of the preceding embodiment.

As shown in FIG. 9, contoured screen 16 is initially positioned at the bottom of tank 12. Tank 12 is then filled with water and chopped reinforcing fibers to create a slurry 35. Further added to slurry 35 are the binding fibers. In this embodiment the binding material is just a matrix of thermoplastic material, and preferably, thermoplastic fibers. The matrix material may be any of the thermoplastic materials, such as thermoplastic polyester, polypropylene, polyethylene, or nylon, suitable for forming into fibers. The binding material consists of a thermoplastic polyester material, which melts when exposed to high temperature steam. When exposed to cool air, the melted thermoplastic fibers solidify to temporarily bind the reinforcing fibers of the fiber reinforced preform in place. The thermoplastic fibers can be made by melting a mass of thermoplastic material, extruding it through a spinnerette or other suitable device and spinning or drawing it to a predetermined diameter. The fibers may then be cut to length. In the preferred embodiment of the present invention, the fibers are preferably 25–50 microns in diameter and cut approximately about 0.25–1.25 inches in length.

With reference to FIGS. 9 and 10, removable contoured screen 16, mask 14 and frame 28 are raised to the top of tank 12 by activating a piston 31 attached to frame 28 in a similar manner as described in the prior embodiment.

FIGS. 10 and 11 show the apparatus in its finished position. Once raised to the top of tank 12 the reinforcing fibers and binding material of slurry 35 are deposited on removable contoured screen 16 in the desired preformed shape 36. In this embodiment, a second contoured screen 66, substantially the same shape and size as the inside surface of preform 36 is mounted to base 45. Second screen 66 and base 45 are lowered under the action of piston 48. Second screen 66 nests within removable contoured screen 16 capturing and holding the reinforcing fibers and binding material in place. Second screen 66 and removable contoured screen 16 are forced together with sufficient pressure to compress the reinforcing fibers and binding material together and remove trapped water from the preform.

As further shown in FIGS. 9, 10, 11 and 12, high temperature steam inlet conduit 68 and cool air inlet conduit 70 are mounted to base 45. Base 45 contains a high temperature steam inlet conduit opening 72 therein to allow for passage of high temperature steam from high temperature steam conduit 68 to chamber 76 and to the inner surface of second screen 66. The high temperature steam is then discharged through a plurality of openings 78 formed in second screen 66 and through preform 36 formed on removable contoured screen 16. Base 45 also contains a cool air inlet conduit opening 74 therein to allow for passage of cool air from cool air inlet conduit 70 through base 45 to preform 36 in substantially the same manner.

In operation, removable contoured screen 16, reinforcing fibers, binding material and second screen 66 are exposed to high temperature steam or other heated fluid. This high temperature steam is sufficiently hot (at least 150° C.) and is maintained for a sufficient period of time (between 15 to 90 seconds) to melt the binding material. The heating of the binding material by the high temperature steam raises the temperature of the preform in the immediate area of the binding material causing vaporization of water droplets adjacent to the binding material. After the binding material is melted, removable contoured screen 16, reinforcing fibers, binding material and second screen 66 are exposed to a quantity of cool air (below about 150° C.) for about 10 to 30 seconds, sufficient enough to solidify the binding material and temporarily lock the reinforcing fibers in place. Accordingly, this high temperature steam and cool air combination need be applied only for a limited period of time in order to transform the wet, unmanageable raw preform into an easily handled unit.

Once the reinforcing fibers of preform 36 have been bound together, second screen 66 is retracted to a position above tank 12. Removable contoured screen 16, mask 14 and frame 28 are then lowered into tank 12 whereby air in tank 12 trapped between the surface of the slurry and the bottom of mask 14 is forced through removable contoured screen 16 thereby causing preform 36 to be ejected from removable contoured screen 16. Ejected preform 36 may be retrieved by any suitable method. Retrieved preform 36 then can be subjected to a drying process to remove residual water. This can be accomplished in a variety of manners such as forced air convection drying and other suitable methods which would be compatible with the teachings of the present invention. Once preform 36 is dried, a fiber reinforced part is created by placing preform 36 in a mold and injecting resin into the mold, preferably using the above-described resin transfer molding (RTM) process. The resin impregnates the fibers of preform 36 thereby forming the desired structure.

FIGS. 13–17 show a third embodiment of the present invention where, unlike the previous embodiments, there is no need for the resin injection step to form the final part. Like reference numerals are used to identify like elements of the preceding embodiments.

A schematic representation, as shown in FIG. 13, concisely and succinctly sets forth the steps for forming a fiber reinforced plastic structure according to the third embodiment of the present invention.

As shown at box 200 of FIG. 13 and illustrated in FIG. 14, contoured screen 16 is initially positioned at the bottom of tank 12. Tank 12 is then filled with water and chopped reinforcing fibers 81 to create a slurry 35. In this embodiment, binding fibers 83 of the type generally disclosed in the earlier embodiments are added to slurry 35 along with resin matrix fibers 85.

The binding fibers 83 are made of thermoplastic material and have a lower melting point and a lower proportion by weight when compared with the resin matrix fibers 85. Typically, the binding fibers 83 comprise approximately 2–7 percent by weight of the total weight of the preform and have a melting temperature of less than about 270° F. On the other hand, thermoplastic resin matrix fibers 85 comprise approximately 30–70 percent by weight of the total weight of the preform and have a melting temperature of between about 300° F. and about 450° F. The reinforcing fibers 81 constitute the balance of the total weight of the fiber reinforced plastic structure.

As in the previous embodiments, the reinforcing fibers 81 may be made from glass, graphite, polyester or other suitable reinforcing fibers. Typically, the reinforcing fibers 81 will be approximately 0.5 to 4 inches in length and 25 to 50 microns in diameter. The binding fibers 83 are about 25 to 50 microns in diameter and about 0.25 to 1.25 inches in length. The binding fibers 83, as in the earlier examples, can be made of thermoplastic polyester, polypropylene, polyethylene or nylon. The thermoplastic resin matrix fibers 85 can be made of polypropylene, thermoplastic polyesters (PETs) or nylons, with a length of about 0.5 to 3 inches and a diameter of about 25 to 50 microns. Instead of the binding fibers 83 being separate from the thermoplastic resin matrix fibers 85, it is possible that a single fiber can be created in which the composition contains thermoplastic materials with different melting points and with different by-weight percentages in order to arrive at the desired characteristics.

With reference at box 202 of FIG. 13 and illustrated in FIGS. 14 and 15, removable contoured screen 16, mask 14 and frame 28 are raised to the top of tank 12 by activating piston 31 attached to frame 28 in a similar manner as described in the prior embodiments.

With continuing reference to FIG. 15, once raised to the top of tank 12, the reinforcing fibers 81, the binding fibers 83 and the matrix resin fibers 85 of slurry 35 are uniformly deposited on removable contoured screen 16 in the desired preform 36 shape. In this embodiment, once the wet preform 36 has been raised to the top of tank 12, the contoured screen 16 and wet preform 36 are removed from tank 12 and placed into an oven 79 as shown at box 204 of FIG. 13 and schematically illustrated in FIG. 16. High temperature fluid, such as steam, is then drawn through preform 36 by creating a negative pressure differential between the top and bottom of preform 36. The high temperature fluid or steam generated thereby will be sufficient to melt the thermoplastic binding fibers 83 but not the thermoplastic resin matrix fibers 85. For example, the preform can remain in the oven which is heated to about 300° F. for about 1 minute. After cooling, reinforcing fibers 81 are temporarily bound by the melted binding fibers 83 to create tackified preform 80. By the term "tackified preform" it is meant that the preform is bound together sufficiently so that it can be removed from the screen and handled without being easily deformed. However, it does not have the desired structural rigidity for the final part. For example, the tackified preform can generally withstand loads of about 20 psi without substantial deformation but will be deformed by higher loads.

As shown at boxes 206 and 208 of FIG. 13 and illustrated in FIG. 17, tackified preform 80 is removed from contoured screen 16 and placed in a complementary cavity 82 of mold 84. Mold 84 has a relatively smooth molding surface 86. Mold 84 can be open-ended but preferably includes a cover 88. Cover 88 can take a variety of forms and it is presently contemplated that it can take the form of a flexible diaphragm which can be drawn by a vacuum against the upper surface of the preform. In FIG. 17, however, cover 88 is shown as a pivoted rigid lid having a lower surface complementary in shape to the preform. Cover 88 is attached to mold 84 by any standard type of hinge mechanism 90 and is secured in a closed position by any standard type of latch mechanism 92. Cover 88 is held against the outer surface of tackified preform 80 while tackified preform 80 is supported in complementary cavity 82 of mold 84. The resultant pressure on tackified preform 80 due to cover 88 is relatively low, however, just sufficient enough to provide part definition.

As further shown at box 208 of FIG. 13 and illustrated in FIG. 17, high temperature fluid or steam source 94 and cool air source 96 are regulated by valve 98. Inlet conduit 99 connects valve 98 to mold 84. Disposed within mold 84 are heat transfer passageways 100 which allow for passage of high temperature fluid or steam from source 94 or cool air from source 96 throughout mold 84. Heat transfer passageways 100 are oriented in any standard type pattern to sufficiently heat or cool mold 84. One skilled in the art would readily recognize that heat transfer passageways 100 can be arranged such that different locations of mold 84 could have different heat transfer rates.

The mold 84 is heated to a temperature exceeding the melting temperature of the thermoplastic resin matrix fibers 85 to cause them to flow throughout the preform and surround the reinforcing fibers 81. Typically, the mold is heated to about 300° to 450° F. for a period of time between about 30 and 120 seconds.

After the thermoplastic resin matrix fibers 85 are melted, cool source 96 provides a sufficient amount of cool air or other fluid through valve 98, inlet conduit 99 and heat transfer passageways 100 to cool the mold 84. Tackified preform 80 is thereby cooled, sufficient enough to solidify the melted fibers 85 and bind the reinforcing fibers 81 in place to generate a substantially homogeneous fiber reinforced plastic structure having a sufficient concentration of resin matrix fibers and reinforcing fibers to provide structural rigidity. Typically, the mold is cooled to below about 290° F. for a period of time between about 15 and 30 seconds. The final part is then removed from the mold 84. The final part is characterized by a significantly higher structural rigidity than the tackified preform. For example, the final part can withstand tensile loads of over 5,000 psi without substantial deformation.

Some advantages of the method and apparatus of the third embodiment of the present invention is that there is no substantial displacement of fibers as compared to conventional structural molding compound (SMC) compression molding techniques since the slurry process already forces the fibers to be uniformly distributed throughout the preform. Therefore, a better, smoother surface is obtainable since no knit lines are encountered. Additionally, large, high tonnage presses are not required to form the desired fiber reinforced plastic structure. It is also possible thereafter to reheat and reshape the thermoplastic products of the present invention. Moreover, there is no styrene or resin involved in the method of the present invention and, therefore, it is possible to recycle the thermoplastic products generated by this method easier, thereby rendering an increased benefit to the environment.

Another significant advantage is that there is no resin injection step required in order to form the final part, as in the RTM procedure described in connection with the first two embodiments.

It should be appreciated by those skilled in the art that modifications can be made without departing from the true spirit or fair scope of the present invention. The present invention will therefore be understood as susceptible to modification, alteration or variation by those skilled in the art without deviating from the scope of the invention as defined by the following claims.

What is claimed is:

1. A method for forming a fiber reinforced plastic structure which comprises:
   (a) creating a one-piece preform having three-dimensional contours approximating a desired shape for the structure, said preform being made from a mixture having reinforcing fibers and thermoplastic meltable resin matrix fibers;
   (b) placing the preform into a complementary shaped mold;
   (c) heating the preform to a temperature sufficient to melt the resin matrix fibers into a resin which flows to surround the reinforcing fibers without substantial displacement of the reinforcing fibers;
   (d) cooling the preform to solidify the resin matrix fibers and form a rigid fiber reinforced plastic structure having an essentially uniform distribution of the reinforcing fibers therein bound together by the resin of the resin matrix fibers without introducing additional resin into the preform;
   (e) wherein the mixture includes a sufficient concentration of the resin matrix fibers to yield a substantially homogenous fiber reinforced plastic structure and a sufficient concentration of the reinforcing fibers to provide structural rigidity to the fiber reinforced plastic structure; and
   (f) removing the rigid fiber reinforced plastic structure from the mold.

2. The method of claim 1 wherein the resin matrix fibers comprise first thermoplastic fibers and wherein second thermoplastic fibers are also used in the preform, with the method further comprising:
   dispersing said first thermoplastic fibers and said second thermoplastic fibers evenly amongst the reinforcing fibers of the preform.

3. The method of claim 2 wherein said second thermoplastic fibers have a lower melting point and a lower concentration than said first thermoplastic fibers.

4. The method of claim 3 wherein step (a) comprises:
   mixing the reinforcing fibers, the first thermoplastic fibers and the second thermoplastic fibers together in a tank to form a slurry;
   raising a screen in the tank to cause the fibers to be deposited on the screen to form a preform;
   heating the preform, prior to placing the preform in the mold, to a temperature above a melting point of the second thermoplastic fibers but below a melting point of the first thermoplastic fibers to temporarily bind the reinforcing fibers in the preform to yield a tackified preform;
   thereafter, heating the tackified preform in said mold to a higher temperature which is above the melting point of the first thermoplastic fibers to cause them to melt and flow throughout the tackified preform; and
   cooling the preform to generate a fiber reinforced plastic structure having an essentially uniform distribution of reinforcing fibers therein bound together by at least the first thermoplastic fibers.

5. The method of claim 4 wherein the meltable resin matrix fibers comprise first thermoplastic fibers in a concentration of approximately 30–70 percent by weight of a total weight of the preform.

6. The method of claim 5 wherein the second thermoplastic fibers comprise approximately 2–7 percent by weight of the total weight of the preform and have a melting temperature of less than about 270° F.

7. The method of claim 6 wherein the step of heating the preform comprises:
   drawing a high temperature fluid through the preform while on the screen to melt the second thermoplastic fibers sufficiently to create a tackified preform wherein the tackified preform can be easily handled and removed from the screen; and
   thereafter, removing the tackified preform from the screen.

8. The method of claim 7 which further comprises:

placing a cover over the tackified preform during the heating of the tackified preform and applying sufficient pressure to the preform during heating and subsequent cooling to maintain the desired shape of the structure.

9. Method for forming a fiber reinforced plastic structure which comprises:

a) placing a contoured screen in a tank filled with liquid;

b) adding reinforcing fibers to the liquid to create a slurry wherein a length of the reinforcing fibers ranges from 0.5 to 6 inches;

c) adding meltable resin matrix thermoplastic fibers to the slurry wherein a length of the resin matrix fibers ranges from 0.5 to 3 inches;

d) adding meltable binding thermoplastic fibers to the slurry, wherein a length of the binding fibers ranges from 0.25 to 1.25 inches, the binding fibers have a lower melting point and a lower concentration than the meltable resin matrix thermoplastic fibers, the binding fibers comprising approximately 2–7 percent by weight of a total weight of a preform and having a melting temperature of less than about 270° F., and wherein the resin matrix fibers comprise approximately 30–70 percent by weight of the total weight of the preform and having a melting temperature of between about 300° F. and about 450° F.;

e) raising the screen in the tank thereby causing the fibers to be deposited on the screen to form a one piece preform having three dimensional contours approximating a desired shape for the structure;

f) removing the screen from the tank;

g) heating the preform to a temperature above the melting point of the binding fibers but below the melting point of the resin matrix fibers to yield a tackified preform;

h) removing the tackified preform from the screen;

i) placing the tackified preform in a mold, the mold having a pair of complimentary dies, each having contoured molding surfaces defining a three dimensional cavity, such that the three dimensional contours of the preform generally conform to the molding surfaces of the dies;

j) heating the tackified preform to a temperature above about 300° F. and sufficient to melt the meltable resin matrix fibers such that the meltable resin matrix fibers melt into a resin which flows throughout the tackified preform without substantial displacement of the reinforcing fibers to yield a fiber reinforced plastic structure having an essentially uniform distribution of the reinforcing fibers therein bound together by at least the resin provided by the resin matrix fibers thereby eliminating a need for introducing additional resin into the preform; and k) removing the fiber reinforced plastic structure from the three dimensional cavity of the mold.

10. The method of claim 9 which further comprises, after step i):

placing a cover over the tackified preform during the heating of step j) and applying sufficient pressure to the tackified preform during the heating and the subsequent cooling to maintain the desired shape of the structure.

11. The method of claim 9 wherein the resin matrix fibers and the binding fibers comprise thermoplastic polyesters.

* * * * *